United States Patent Office 3,306,338
Patented Feb. 28, 1967

3,306,338
APPARATUS FOR THE APPLICATION OF
INSULATED A.C. FIELDS TO FLARES
Franklin J. Wright, Watchung, and Duane G. Levine, Fanwood, N.J., assignors to Esso Research and Engineering Company, a corporation of Delaware
Filed Nov. 1, 1965, Ser. No. 505,943
3 Claims. (Cl. 158—99)

This invention relates to the application of electrostatic fields to flares. More particularly, the invention relates to apparatus for improving the flame characteristics of flares resulting from the combustion of gases and vapors derived from industrial operations.

Many industrial plants have occasion to vent combustible materials into the atmosphere. These materials are usually vented from a vertical stack and burned. Petroleum refineries, petrochemical plants and chemical plants employ this practice on a continuous basis or on an intermittent basis. For example, catalytic cracking plants circulate great quantities of hydrocarbon gas and vapor and during startup periods and emergency situations the gases are flared.

The flames resulting from flaring are usually diffusion flames. The fuel flows out of the stack and mixes with atmospheric air to form a combustible mixture above the top of the stack. Under these conditions, the air is not efficiently mixed with the fuel and the flames have the bright yellow color characteristic of inefficient combustion of fuels. It has been suggested to add steam, premixed air and other gases to the fuel gas or vapor but such techniques have not found general acceptance in industry for a number of reasons including high installation and operating costs.

The object of the present invention is to provide an effective low cost device for improving the efficiency of combustion of flared combustible materials.

It has been known for over a hundred years that flames conduct electricity. More recently, it has been determined that certain ionic species are responsible for this phenomenon. The most widely accepted path for the formation of ions in flames is the following:

$$CH + O \rightarrow CHO^+ + e^-$$
$$CHO^+ + H_2O \rightarrow CO + H_3O^+$$

In the reaction zone of a pure hydrocarbon flame, concentrations of $10^{12}$–$10^{14}$ ions/cc. can be reached.

In copending application Serial Number 505,944, filed November 1, 1965, in the name of Franklin J. Wright and assigned to the same interests, a disclosure is made of the application of insulated A.C. electrostatic fields to flames. The aforementioned disclosure teaches that combustible materials such as propane-air mixtures are benefitted by the application of an insulated A.C. field.

We have found that the concepts disclosed in the aforementioned disclosure can be applied to flares.

Figure 1:
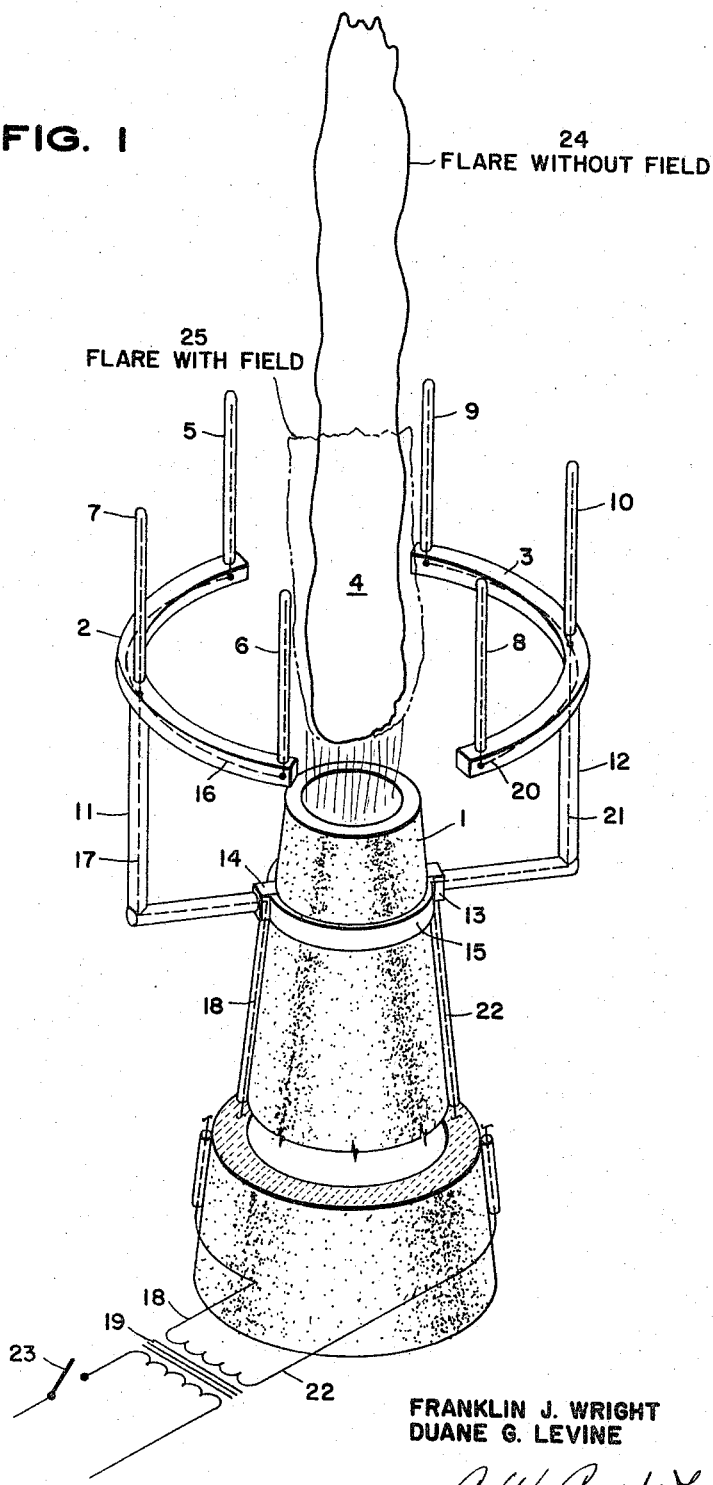
Figure 2:
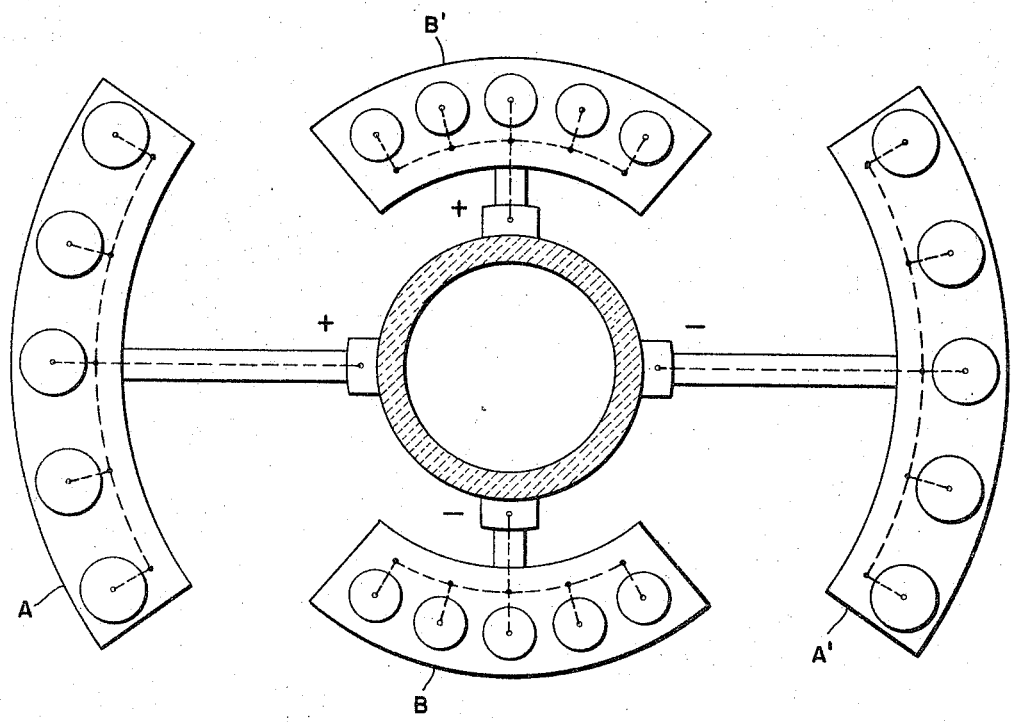

The invention will be more fully described with reference to the attached drawings in which FIGURE 1 is a schematic view of the apparatus showing one arrangement of the apparatus elements and FIGURE 2 is a top view of a stack fitted with two independent sets of electrodes.

Referring to FIGURE 1, reference numeral 1 denotes the upper portion of a stack. The stack is of conventional shape and construction and it may vary in height from a few feet to a hundred feet or more. A pair of electrode brackets 2 and 3 are located on approximately opposite sides of the intense combustion area of the flame. The intense combustion area is shown generally by reference numeral 4. Three insulated electrodes 5, 6 and 7 are mounted in spaced relationship on bracket 2. Bracket 3 also carries three insulated electrodes 8, 9 and 10 mounted in spaced relationship. The brackets can be curved to partially encircle the flame or they can be shaped in any other desired manner to orient the lines of force of the electrostatic field across the flame. While six electrodes have been shown, any suitable number of electrodes can be used. The number, size, shape and proximity of the electrodes to the flame depends on the size, shape, temperature and velocity of the flame as well as the type of fuel, corrosion problems and safety considerations. Bracket 2 is mounted in a brace which extends horizontally from the stack for a suitable distance and then vertically to hold the bracket at the desired level relative to the flame. Bracket 3 is similarly mounted on brace 12. The braces are fastened to the stack by anchoring units 13 and 14 and the units are held in place by a metal band 15 which encircles the stack. Any other suitable means of bracing the brackets and fastening them to the stack can be employed.

Insulated electrodes 5, 6 and 7 are joined in parallel by conductor 16 and conductors 17 and 18 connect these electrodes to transformer 19. Insulated electrodes 8, 9 and 10 are joined in parallel by conductor 20 and conductors 21 and 22 connect these electrodes with transformer 19. The conductors have been shown to be enclosed in the brackets, braces, etc. This is necessary to protect them from the flame which will often be affected by wind. The insulating and protection of the conductors can be accomplished by the use of nonconductive materials in preparing the brackets and braces or by using conductors which are heavily coated or wrapped with insulating and protecting materials which are placed inside hollow metal braces and brackets.

Transformers and any other electrical units employed in supplying the required A.C. current are ordinarily placed at ground level and the conductors connecting the ground level electrical equipment and the electrodes can be attached to the stack in any suitable manner.

When the A.C. field is to be applied to the flare, switch 23 is closed activating transformer 19. The transformer can be of the variable type capable of supplying a voltage of 1–2000 kv. Frequencies of 10–2000 cycles per second are satisfactory and frequencies of 60–500 cycles per second are preferred. Power dissipation is negligible since there is essentially no flow of current across the flare and improved combustion is obtained due to the effect of the A.C. field alone.

Flares derived from the combustion of gases and liquids and mixtures thereof will be improved by application of the A.C. field. Liquids pass up the stack in finely divided form as vapors, fog and mist. Any fuel containing a substantial proportion of C—H linkages such as methane, ethane, propane, butane, natural gas, and vapors of petroleum fractions can be flared. The fuels can also contain $H_2S$, $CO$, $CO_2$, $H_2$, water vapor, fly ash and other gases, vapors and solids.

The typical flame provided by the combustion of a fuel in the absence of the A.C. field is shown by the solid outline above the stack of FIGURE 1 and it is designated generally by reference numeral 24. Such flares extend from a few feet to over a hundred feet above the top of the stack. They are yellow in color due to incomplete combustion of the fuel. When the A.C. field is applied the flare becomes shorter and thicker as shown by the dotted line and reference numeral 25.

FIGURE 2 is a top view of an embodiment of the invention in which two separate insulated A.C. electrostatic fields are applied across a flare at different frequencies. A pair of electrode brackets shown generally by reference letters A and A′ are placed at approximately 90 degrees to a second pair of electrode brackets B and B′. Both sets of electrodes are attached to the stack C in any suitable manner. The brackets are placed relative to the flare and the stack in a relationship similar to that shown in FIGURE 1. The parallel wiring of the individual electrodes on each bracket and the conductors connecting the brackets to the transformers on the ground are similar to those shown in FIGURE 1. Two transformers, not shown, are used to provide two independent A.C. fields. Preferably, the transformers provide different frequencies. For example, the transformer serving electrodes A and A' may operate at a frequency of 60 cycles and the transformer supplying electrodes B and B' can be operated at 120 cycles which is in phase or the second transformer can be operated out of phase at 10 cycles, 160 cycles, 300 cycles or at any other desired frequency. The electrode pairs can be placed at the same horizontal level relative to the flame or they can be vertically spaced.

The apparatus of the present invention will provide a shorter flame in which the yellow color is substantially eliminated. These advantages will be obtained at very low cost due to the simplicity of the apparatus and low power dissipation across the A.C. field.

What is claimed is:

1. Apparatus for improving flame characteristics of a flare issuing from the top of an elevated stack, comprising:
   (a) a vertical stack which vents at its top a combustible fuel mixture that mixes with surrounding atmospheric air to form the flare by combustion in a flare area above the stack;
   (b) at least a pair of insulated electrodes upstanding on opposite sides of the flare area, said electrodes being spaced in said surrounding atmospheric air from each other and from the flare area in proximity thereto; and
   (c) means for charging said electrodes to opposite polarity by alternating electric current at sufficient voltage to develop an alternating electrostatic field across the flare area with no flow of electric current from the electrodes across the flare area.

2. Apparatus according to claim 1 in which a number of pairs of electrodes described are arranged to develop at least two electrostatic fields across the flare area.

3. Apparatus for improving flame characteristics of a flame issuing from the top of a stack elevated above ground level, comprising:
   (a) a vertical stack which vents at its top a combustible fuel mixture that mixes with surrounding atmosphere air to form the flare by combustion in a flare area above the stack;
   (b) a plurality of upstanding electrodes spaced from each other in said surrounding air and from the flare area so that atmospheric air has access to the flare area between the spaced electrodes;
   (c) insulating material protecting said electrodes from contact with the flare;
   (d) at least one pair of electrode brackets for supporting a number of the electrodes connected in parallel to an electric conductor in each bracket;
   (e) a brace means orienting each bracket toward the flare area so that its supported electrodes are spaced from and in proximity to part of the flare area and orienting each bracket to a bracket on an opposite side of the flare area;
   (f) anchor means attaching said brace means to an upper portion of the stack: and
   (g) transformer and electrical conductor means for supplying alternating current to the electrical conductor in each bracket in a manner that the electrodes supported by one bracket have an opposite polarity from that of electrodes in a bracket on the opposite side of the flare in developing an alternating electrotsatic field across the flare area with no flow of electric current from the electrodes into said area.

References Cited by the Examiner

UNITED STATES PATENTS

| | | |
|---|---|---|
| 1,473,716 | 11/1923 | Willcox. |
| 2,763,125 | 9/1956 | Kadosch et al. |
| 2,963,864 | 12/1960 | Gross. |
| 3,224,485 | 12/1965 | Blomgren et al. _____ 158—28 X |

JAMES W. WESTHAVER, *Primary Examiner.*